United States Patent
Doi

(10) Patent No.: US 10,070,368 B2
(45) Date of Patent: Sep. 4, 2018

(54) COMMUNICATION RELAYING APPARATUS, COMMUNICATION RELAYING SYSTEM, METHOD, AND COMPUTER PROGRAM PRODUCT

(71) Applicant: Kabushiki Kaisha Toshiba, Minato-ku (JP)

(72) Inventor: Toshinori Doi, Inagi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/414,136

(22) Filed: Jan. 24, 2017

(65) Prior Publication Data
US 2017/0223603 A1   Aug. 3, 2017

(30) Foreign Application Priority Data
Jan. 29, 2016 (JP) ................................ 2016-015116

(51) Int. Cl.
*H04W 40/22* (2009.01)
*H04B 7/15* (2006.01)
*H04W 84/04* (2009.01)

(52) U.S. Cl.
CPC .............. *H04W 40/22* (2013.01); *H04B 7/15* (2013.01); *H04W 84/047* (2013.01); *Y02D 70/1262* (2018.01); *Y02D 70/39* (2018.01)

(58) Field of Classification Search
CPC .............................. H04W 24/00; H04W 40/22
USPC ...................... 455/67.11, 7, 11.1, 452.1, 509
See application file for complete search history.

(56) References Cited

U.S. PATENT DOCUMENTS

| | | | |
|---|---|---|---|
| 2003/0125067 A1* | 7/2003 | Takeda ................ | H04W 52/247 455/522 |
| 2009/0219852 A1* | 9/2009 | Youn ...................... | H04L 45/00 370/315 |
| 2009/0227258 A1* | 9/2009 | Youn .................... | H04B 7/2606 455/445 |

FOREIGN PATENT DOCUMENTS

| | | |
|---|---|---|
| JP | 2008-91984 | 4/2008 |
| JP | 2012-217174 | 11/2012 |
| WO | WO 2008/129680 A1 | 10/2008 |

* cited by examiner

*Primary Examiner* — John J Lee
(74) *Attorney, Agent, or Firm* — Oblon, McClelland, Maier & Neustadt, L.L.P.

(57) ABSTRACT

According to one embodiment, a communication relaying apparatus directly or indirectly relays communication between a base transceiver station and a mobile communication terminal. The communication relaying apparatus includes a determiner and an interrupter. The determiner determines whether an uplink signal is received from the mobile communication terminal through a wireless communication antenna. The interrupter interrupts, when the determiner determines that the uplink signal is not received, a transmission path of the uplink signal to the base transceiver station side.

6 Claims, 5 Drawing Sheets

COMMUNICATION RELAYING APPARATUS, COMMUNICATION RELAYING SYSTEM, METHOD, AND COMPUTER PROGRAM PRODUCT

CROSS-REFERENCE TO RELATED APPLICATIONS

This application is based upon and claims the benefit of priority from Japanese Patent Application No. 2016-015116, filed Jan. 29, 2016, the entire contents which are incorporated herein by reference.

FIELD

An embodiment described herein relates generally to a communication relaying apparatus, a communication relaying system, a method, and a computer program product.

BACKGROUND

Conventionally, there has been known an optical repeater system (communication relaying system) by which mobile communication terminals such as smartphones are usable indoors.

This optical repeater system causes a plurality of remote units to be connected to one master unit that is connected to a base transceiver station so as to effectively expand a communication area of the base transceiver station. In this manner, a wide range of indoor communication areas such as large-scale commercial facilities and office buildings is covered.

The conventional technique, however, causes output of a low noise amplifier (LNA) prepared for each remote unit to be synthesized as an up signal (uplink signal UL).

Thus, in a master unit, noise is synthesized for the number of remote units, and this processing may cause deterioration in a synthetic noise figure (NF) that is a total noise figure (NF) as a whole optical repeater system.

DETAILED DESCRIPTION

In general, according to one embodiment, a communication relaying apparatus directly or indirectly relays communication between a base transceiver station and a mobile communication terminal. The communication relaying apparatus comprises a determiner and an interrupter. The determiner determines whether an uplink signal is received from the mobile communication terminal through a wireless communication antenna. The interrupter interrupts, when the determiner determines that the uplink signal is not received, a transmission path of the uplink signal to the base transceiver station side.

An embodiment will be described with reference accompany drawings.

Figure 1:
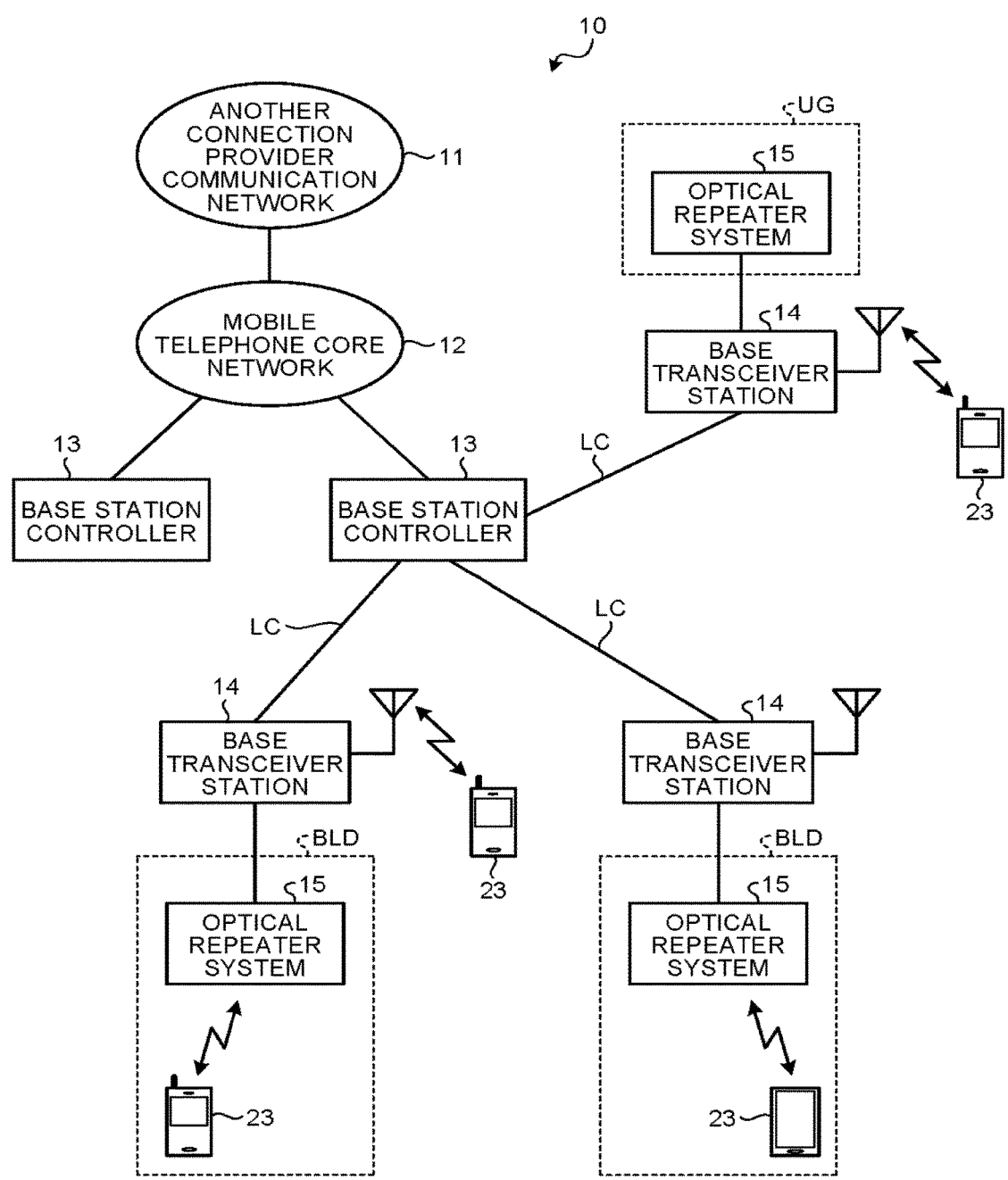
FIG. 1 is an exemplary block diagram illustrating a schematic configuration of a mobile telephone communication network according to an embodiment.

FIG. 1 is a block diagram illustrating a schematic configuration of a mobile telephone communication network according to an embodiment.

A mobile telephone communication network 10 includes a mobile telephone core network 12 that interconnects another connection provider communication network 11 through an interconnecting gateway switch, which is not illustrated, and controls connection with a mobile telephone terminal belonging to the connection provider; a plurality of base station controllers 13 that are connected to the mobile telephone core network 12, and manage and control base stations, which will be described later; a plurality of base transceiver stations (BTSs) 14 connected to each of the base station controllers 13; and optical repeater systems (communication relaying systems) 15 connected to the corresponding BTSs through radio-frequency (RF) cables.

In the embodiment, the optical repeater systems 15 are disposed in buildings (BLDs) and underground (UG) cities that are one kind of, what is called, blind zones.

Figure 2:
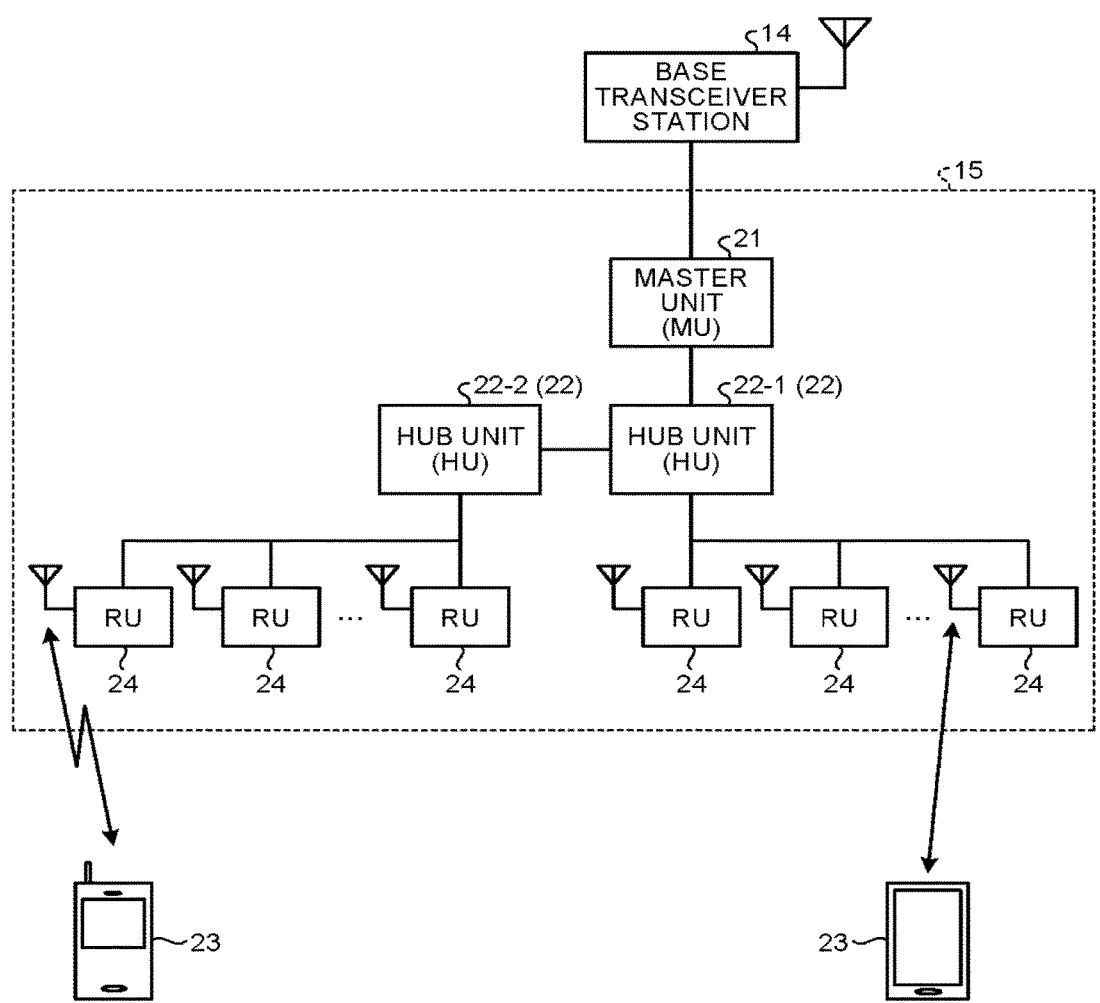
FIG. 2 is an exemplary block diagram illustrating schematic configuration of an optical repeater system according to the embodiment.

FIG. 2 is a block diagram illustrating a schematic configuration of the optical repeater system.

Each of the optical repeater systems 15 includes a master unit (MU) 21 that is connected to the BTS 14 through an RF cable; a hub unit (HU) 22 that is connected to the MU 21 through a light, cable LC, the HU 22 being also connected to other HUs through a light cable LC; and a plurality of remote units (RUs) 24 that are wirelessly connected to mobile communication terminals 23 such as mobile telephones and smartphones. FIG. 2 illustrates each of the remote units 24 as RU.

Figure 3:
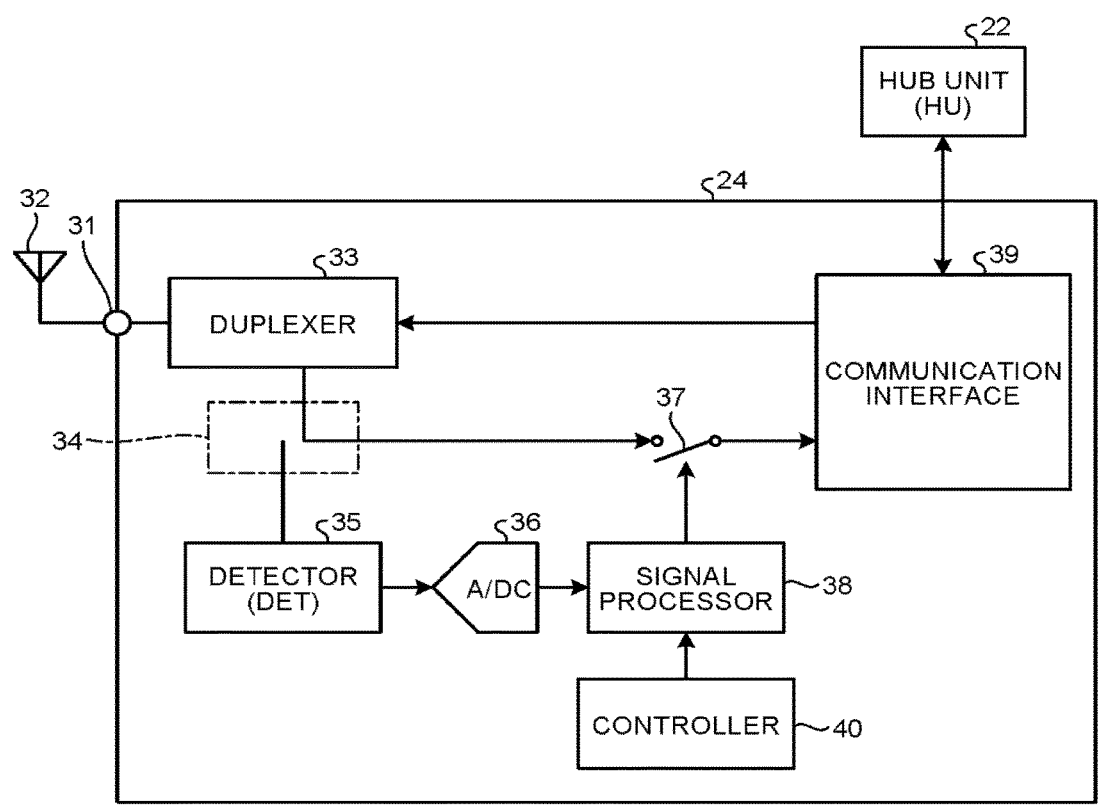
FIG. 3 is an exemplary block diagram illustrating a schematic configuration of a remote unit according to the embodiment.

FIG. 3 is a block diagram illustrating a schematic configuration of each of the RUs 24.

The RU 24 includes a duplexer (DUP) 33 with which an antenna 32 connected thereto is shared with a downlink signal (down signal) DL and an uplink signal (up signal) UL through an antenna port 31 when communicating with the mobile communication terminals 23.

The RU 24 includes a detector (DET) 35 formed as a rot mean square (RMS) wave detector that is combined with an RF cable serving as a transmission path of an uplink signal UL output from the DUP 33 although a directional coupler 34, receives a branched uplink signal UL, and detects and converts the uplink signal UL to an analog signal; and an analog to digital (A/D) converter 36 that performs analog-to-digital conversion on an analog detection signal output from the DET 35 and outputs the converted signal as digital detection data.

In addition, the RU 24 includes a signal processor 38 that is formed as, for example, a field programmable gate array (FPGA), processes digital detection data output from the A/D converter 36, and controls a switch 37 inserted into a transmission path of an uplink signal UL; an communication interface 39 that performs communication interface operation with the HU 22; and a controller 40 that controls the whole RU 24.

In the configuration described above, the signal processor 38 analyzes digital detection data by a certain time unit under the control of the controller 40. The signal processor 38 determines whether the DUP 33 outputs an uplink signal UL so as to control the switch 37.

Issues of the conventional optical repeater system are studied before the operation explanation of the embodiment.

In the conventional optical repeater system, a plurality of remote units are connected to one master unit. When the optical repeater system covers a wide range of communication areas such as large-scale commercial facilities and office buildings, an uplink signal is obtained by synthesizing LNA output prepared for each remote unit. Thus, in a master unit, noise is synthesized for the number of remote units, and this processing may cause deterioration in a synthetic noise value (synthetic noise figure (NF)) of a whole system.

The following describes detailed explanation.

When a synthetic se value of a whole system is defined as $NF_{Total}$, a noise value for each remote unit is defined as $NF_{1RU}$, and the number of connected remote units is defined as $N_{RU}$, the following expression is formed.

$$NF_{Total} = NF_{1RU} + 10 \cdot \log(N_{RU})$$

For example, when $NF_{1RU}=4$ [dB] and $N_{RU}=50$ [units] are defined, $NF_{Total}$ is obtained as follows.

$$NF_{Total} = 4 + 10 \cdot \log(50)[dB]$$
$$= 4 + 16.9897[dB]$$
$$\approx 21[dB]$$

All of the remote units do not transmit an uplink signal at the same time. In the embodiment, when detecting non-inclusion of an uplink signal UL, each of the RUs 24 turns off the switch 37 and stops transmission of a signal.

The embodiment will be described in detail.

Figure 4:
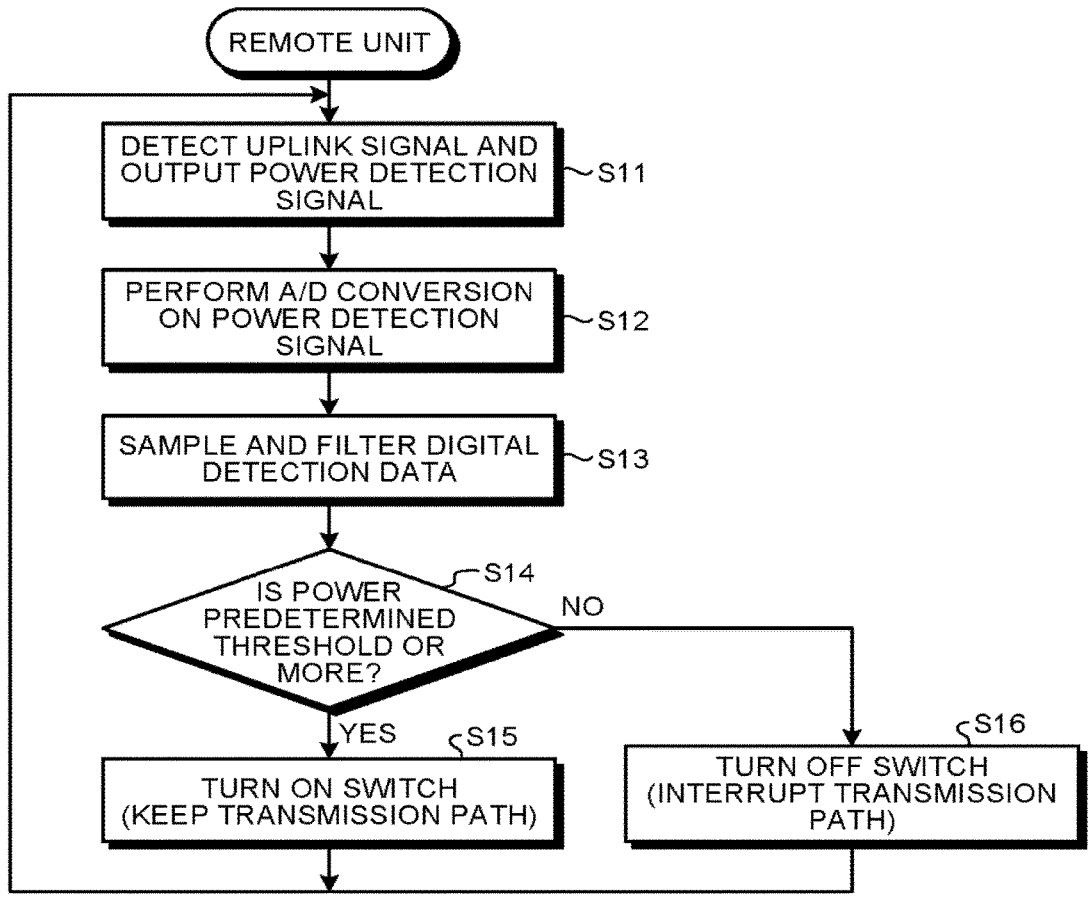
FIG. 4 is an exemplary flowchart illustrating processing of the remote unit according to the embodiment.

FIG. 4 is a flowchart illustrating processing of the remote unit.

The DET 35 in each of the RUs 24 detects an uplink signal UL input through the directional coupler 34. The DET 35 outputs a power detection signal as an analog signal to the A/D converter 36 (S11).

The A/D converter 36 performs analog-to-digital conversion on the power detection signal, and outputs the converted signal as digital detection data to the signal processor 38 (S12).

The signal processor 38 samples and filters the input digital detection data (S13), and determines whether obtained power is a certain threshold or more (S14).

The following describes the setting of a certain threshold.

Figure 5:
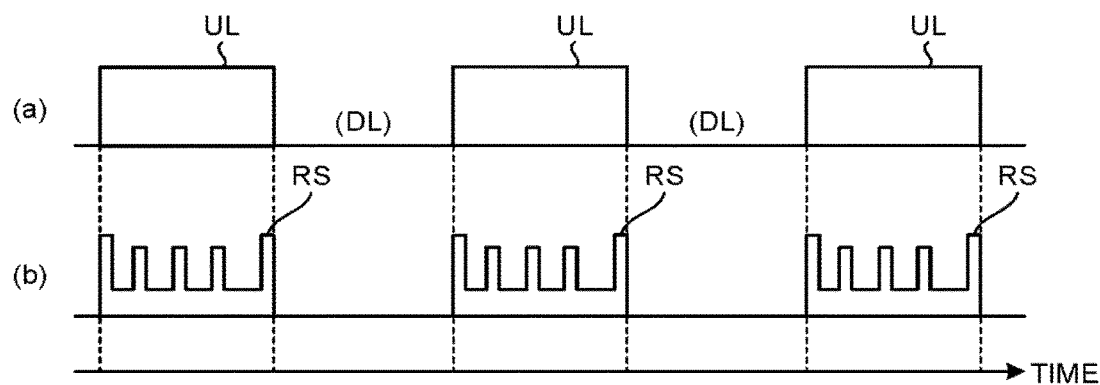
FIG. 5 is an explanatory view illustrating an example of a transmission signal by a Time-Division-Duplex (TDD) system according to the embodiment.

FIG. 5 is an explanatory view illustrating a transmission signal by a Time-Division-Duplex (TDD) system.

The Time-Division-Duplex system is a system for performing transmission by dividing a time with the same frequency band between an uplink signal UL and a downlink signal DL.

FIG. 5(a) is an explanatory view illustrating a transmission timing of an uplink signal UL.

FIG. 5(b) is an explanatory view illustrating a reference signal RS corresponding to the uplink signal UL. As illustrated in FIG. 5(b), a reference signal RS as a timing signal for demodulating an uplink signal UL is always transmitted on a transmission path on which the uplink signal UL is transmitted.

Figure 6:
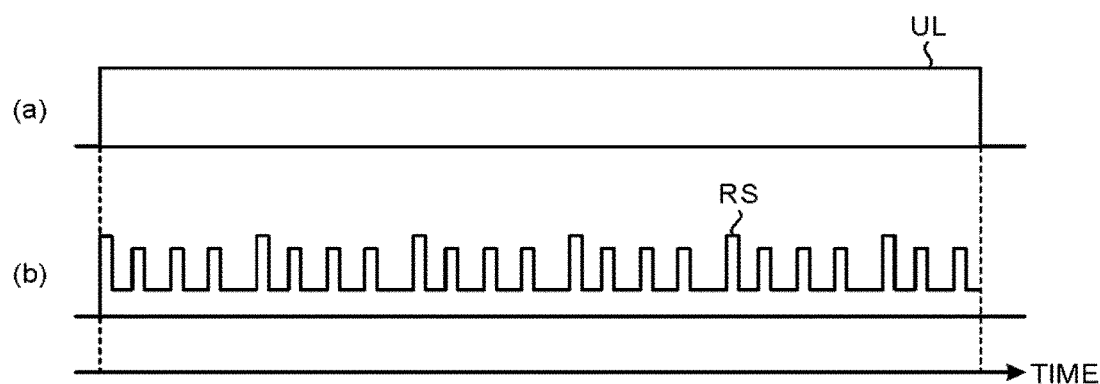
FIG. 6 is an explanatory view illustrating an example of a transmission signal by a Frequency-Division-Duplex (FDD) system according to the embodiment.

FIG. 6 is an explanatory view illustrating a transmission signal by a Frequency-Division-Duplex (FDD) system. The FDD system is a system for performing transmission by dividing a frequency band between an uplink signal UL and a downlink signal DL.

FIG. 6(a) is an explanatory view illustrating a transmission timing of an uplink signal UL.

FIG. 6(b) is an explanatory view illustrating a reference signal RS corresponding to the uplink signal UL.

As illustrated in FIG. 6(b), similarly to the case of the TDD system, a reference signal RS as a timing signal for demodulating an uplink signal UL is always transmitted on a transmission path on which the uplink signal UL is transmitted.

In other words, in both TDD and FDD systems, in either of the following cases where an uplink signal UL is transmitted or where an uplink signal UL is not transmitted, a reference signal RS is included in an output signal from the DUP 33 at a transmittable timing of an uplink signal UL.

Thus, if a power value (power level) higher than that of power as ed when at least a reference signal RS is transmitted at an uplink signal UL transmission timing is defined as a certain threshold, it can be easily determined whether an uplink signal UL is transmitted on a transmission path.

In other words, a threshold may be defined as a power value (power level) higher than a maximum power value assumed when at least a reference signal RS is transmitted and a power value (power level) lower than a minimum power value assumed when an uplink signal UL and a reference signal RS are transmitted.

When it is determined that an uplink signal UL is transmitted on a transmission path (Yes at S14), the switch 37 is turned on (or is being turned on: keeping of a transmission path) (S15).

In this manner, an uplink signal UL transmitted from the mobile communication terminal 23 side is transmitted to the HU 22 side through the communication interface 39.

By contrast, in the determination at S14, when it is determined that an uplink signal UL is not transmitted on a transmission path, in other words, when only a reference signal RS is transmitted (No at S14), the switch 37 is turned off (interruption of a transmission path) (S16).

In this manner, a signal (practically a reference signal RS) is not transmitted from the RU 24 that does not need to transmit an uplink signal UL to the HU 22.

Thus, when only a reference signal RS is transmitted, noise is not transmitted to the MU 21 and noise is not synthesized, either.

According to the embodiment, it is clear that the number of remote units practically connected to the master unit is simultaneously the number of the RUs 24 requiring transmission of an uplink signal UL, and a synthetic NF of the MU 21 can be enhanced.

In addition, enhancement and improvement in a synthetic NF can expand a communication area of the RUs 24. This changes design conditions to be taken into consideration upon installation of the RUs 24 to reduce the number of the RUs 24 required to form the optical repeater systems 15, thereby reducing installation cost.

In addition, enhancement in a synthetic NF substantially enhances throughput of the mobile communication terminals 23.

In addition, enhancement in a synthetic NF improves a signal noise ratio (SNR) of an uplink signal UL. This can reduce the transmission output power of the mobile communication terminals 23, and can reduce the battery consumption of the mobile communication terminals 23, thereby extending a usable time. Furthermore, the battery life can be improved.

Reducing the transmission output power of mobile communication terminals 23 can cause mutual interference of an uplink signal UL from the mobile communication terminals 23 to the RUs 24 to be reduced, thereby enabling satisfactory communication.

A communication traffic amount of the RUs 24 (use rate of an uplink signal UL) can be measured by obtaining a ratio at which a switch is turned off in a communicable period. Thus, increase/decrease in communication traffic, in other words, increase/decrease in the number of users of the mobile communication terminals 23 can be recognized. This secures determination for, for example, extension of the RUs 24, sector division, additional extension of a new band (new frequency band), thereby rapidly performing the corresponding processing.

The embodiment can achieve the above-mentioned effects so as to reduce system cost of the whole optical repeater systems 15.

In particular, the optical repeater system 15 that conforms to the Long Term Evolution (LTE) communication standard enables a mobile communication terminal 23 including transmission data to operate so as to complete data transmission in a short time by allocating a large number traffic channels to the mobile communication terminal 23. Consequently, the number of the mobile communication terminals 23 practically transmitting an uplink signal UL and a substantial transmission time are not so large. Thus, the optical repeater systems 15 that conform to the LTE communication standard can receive more effects of the embodiment.

In the above-mentioned explanation, an RMS wave detector is used as the DET 35.

However, a method can be used for directly or once converting an RF signal to an intermediate frequency (IF) signal, causing the A/D converter 36 to convert the IF signal to a digital signal, and detecting the digital signal on a digital circuit without using the RMS wave detector.

A method can be used for demodulating an uplink signal UL and analyzing actual data (physical uplink shared channel (PUSCH)) signal without using the RMS wave detector.

In other words, whether service to the mobile communication terminals 23 is provided can be determined by determining whether actual data is included.

Furthermore, whether allocation of an uplink signal UL is being performed can be determined by analyzing a control signal included in a downlink signal DL.

The above-mentioned explanation is made using a case where the number of frequency bands (bands) used for communication is one as an example.

However, in recent years, there have been a plurality of frequency bands (for example, 800 MHz and 2.1 GHz bands) used for the optical repeater systems 15, and an uplink signal UL input to the RUs 24 has a plurality of frequency bands. Thus, the same processing as the above-mentioned processing is performed for each frequency band, and the switch is also controlled independently for each frequency band so as to enable independent control for each frequency band and flexibly allocate resources.

In addition, out of a plurality of available frequency bands, when a frequency band is not used by, for example, the mobile communication terminal 23, synchronization is performed on the frequency band and the RU 24 side is turned off so as to reduce the power consumption of the RU 24.

A communication relaying apparatus in the embodiment includes a controller such as a central processing unit (CPU), a storage unit such as a read only memory (ROM) and a random access memory (RAM), an external storage unit such as a hard disk drive (HDD) and a compact disc (CD) drive apparatus, a display apparatus such as a display, and an input apparatus such as a keyboard and a mouse, and has a hardware configuration using a conventional computer.

A control program executed by the communication relaying apparatus in the embodiment is a file in an installable format or in an executable format, and may be recorded and provided in computer-readable recording media such as a compact disc read only memory (CD-ROM), a flexible disk (FD), a compact disc recordable (CD-R), and a digital versatile disc (DVD) as a computer program product.

In addition, the control program executed by the communication relaying apparatus in the embodiment may be stored in a computer connected to networks such as the Internet, and be downloaded via a network so as to be provided. The program executed by the communication relaying apparatus in the embodiment may be provided or distributed via networks such as the Internet.

The control program of the communication relaying apparatus in the embodiment may be preliminarily built into a ROM and the like so as to be provided.

The control program executed by the communication relaying apparatus in the embodiment has a module configuration that includes the above-mentioned units (a determiner and an interrupter). As actual hardware, a CPU (processor) reads the program from the recording media and executes the program so as to load the above-mentioned units on a main storage unit and generate the determiner and the interrupter.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication relaying apparatus that directly or indirectly relays communication between a base transceiver station and a mobile communication terminal, the communication relaying apparatus comprising:
    a determiner that determines whether an uplink signal is received from the mobile communication terminal through a wireless communication antenna; and
    an interrupter that interrupts, when the determiner determines that the uplink signal is not received, a transmission path of the uplink signal to the base transceiver station side;
    wherein the determiner comprises:
    a wave detector that detects a reception signal input through the wireless communication antenna, and
    a signal processor that compares a power level of the reception signal detected by the wave detector with a threshold, and determines whether the uplink signal is received based on a comparison result.

2. The communication relaying apparatus according to claim 1, wherein
    a reference signal is transmitted to the base transceiver station side on the transmission path at a transmittable timing of the uplink signal, and
    the threshold is defined as a power level higher than a maximum power level at the time of transmitting at least the reference signal.

3. The communication relaying apparatus according to claim 1, wherein the interrupter includes a switch that is interposed on the transmission path and interrupts the transmission path.

4. A communication relaying system that relays communication between a base transceiver station and a mobile communication terminal, the communication relaying system comprising:
   a plurality of remote units that receive an uplink signal from the mobile communication terminal through a wireless communication antenna, and relays the received uplink signal; and
   a master unit that is communicable with the remote units, and synthesizes an uplink signal relayed from the remote units and transmits the uplink signal to the base transceiver station, wherein
   each of the remote units includes a determiner that determines whether an uplink signal is received from the mobile communication terminal through the wireless communication antenna, and an interrupter that interrupts, when the determiner determines that the uplink signal is not received, a transmission path of the uplink signal to the master unit side;
   wherein the determiner comprises:
   a wave detector that detects a reception signal input through the wireless communication antenna, and
   a signal processor that compares a power level of the reception signal detected by the wave detector with a threshold, and determines whether the uplink signal is received based on a comparison result.

5. A method executed by a communication relaying apparatus that directly or indirectly relays communication between a base transceiver station and a mobile communication terminal, the method comprising:
   determining whether an uplink signal is received from the mobile communication terminal through a wireless communication antenna; and
   interrupting, when the uplink signal is determined not to be received, a transmission path of the uplink signal to the base transceiver station side;
   wherein the determining comprises:
   detecting a reception signal input through the wireless communication antenna. and
   comparing a power level of the reception signal detected by the wave detector with a threshold, and determining whether the uplink signal is received based on a comparison result.

6. A computer program product including programmed instructions embodied in and stored on a non-transitory computer readable medium, the computer directly or indirectly relaying communication between a base transceiver station and a mobile communication terminal, wherein the instructions, when executed by a computer, cause the computer to perform:
   determining whether an uplink signal is received from the mobile communication terminal through a wireless communication antenna; and
   interrupting, when the uplink signal is determined not to be received, a transmission path of the uplink signal to the base transceiver station side;
   wherein the determining comprises:
   detecting a reception signal input through the wireless communication antenna, and
   comparing a power level of the reception signal detected by the wave detector with a threshold, and determining whether the uplink signal is received based on a comparison result.

* * * * *